No. 874,837. PATENTED DEC. 24, 1907.
E. J. EDWARDS.
ROLLER BEARING.
APPLICATION FILED JAN. 12, 1906.

WITNESSES:

INVENTOR
Ellsworth Joseph Edwards
BY
Munn & Co
ATTORNEYS

UNITED STATES PATENT OFFICE.

ELLSWORTH JOSEPH EDWARDS, OF LOS ANGELES, CALIFORNIA.

ROLLER-BEARING.

No. 874,837.    Specification of Letters Patent.    Patented Dec. 24, 1907.

Application filed January 12, 1906. Serial No. 295,721.

*To all whom it may concern:*

Be it known that I, ELLSWORTH JOSEPH EDWARDS, a citizen of the United States, and a resident of Los Angeles, in the county of Los Angeles and State of California, have invented a new and Improved Roller-Bearing, of which the following is a full, clear, and exact description.

The object of the invention is to provide a new and improved roller bearing for the hubs of wheels, journals, spindles and the like, arranged to reduce the friction of the working parts to a minimum, to take up all end thrust, to render the bearing dust-proof, and to permit of readily applying the roller bearing to different sized axles, journals, spindles, shafts and the like without reconstructing the same.

The invention consists of novel features and parts and combinations of the same which will be more fully described hereinafter and then pointed out in the claims.

A practical embodiment of the invention is represented in the accompanying drawings, forming a part of this specification, in which similar characters of reference indicate corresponding parts in all the views.

Figure 1:
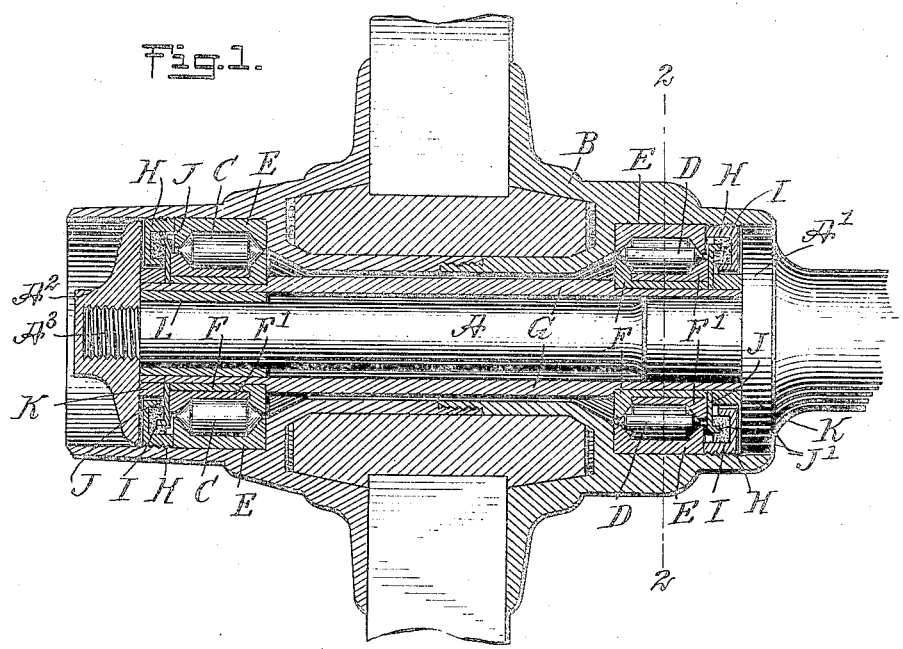
Figure 2:
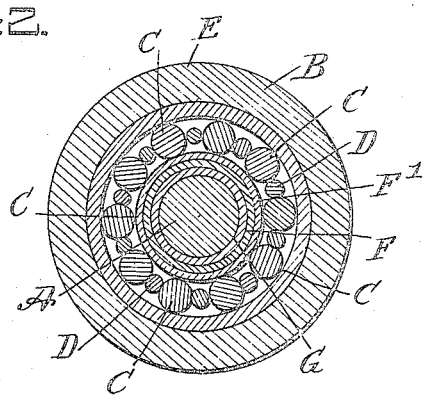
Figure 3:
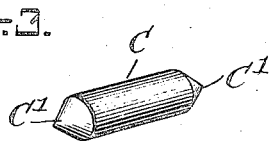
Figure 4:
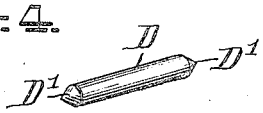

Figure 1 is a sectional side elevation of the improvement as applied to the hub and axle of a wheel; Fig. 2 is a transverse section of the same, on the line 2—2 of Fig. 1; Fig. 3 is a perspective view of one of the main rollers; Fig. 4 is a like view of one of the auxiliary spacing rollers; and Fig. 5 is a similar view of a modified form of the spacing roller.

As illustrated in Fig. 1, two roller bearings, alike in construction, are interposed between the axle, journal or spindle A and the hub B of the wheel, and each roller bearing is provided with alternately arranged main rollers C and auxiliary or spacing rollers D, both sets of rollers having their axes arranged in the same circular path, as will be readily understood by reference to Fig. 2. The bearing boxes for each of the two sets of rollers C and D consist of an outer bearing ring E fitted into the hub B and secured thereto by suitable means, and an inner bearing ring made of two ring-shaped members F and F', of which the member F contains the member F' and is secured to a sleeve G fastened to the journal or spindle A. The outer and inner bearing rings E and F, F' are concentric and spaced apart for the main rollers C to contact with both rings E and F', and the ends of the said rings E and F, F' are formed with beveled shoulders, said shoulders forming the inner and outer half of annular V-shaped grooves, each approximately V-shaped in cross section for the conical ends C' and D' of the rollers C and D to bear against, to thus cause the rollers C and D to travel in the same circular path, as above mentioned.

As indicated in Fig. 2, the main rollers C and the auxiliary or spacing rollers D are in peripheral contact with each other, so that the main rollers C rotate the spacing rollers D in an opposite direction, but the spacing rollers D travel in the same annular path as the main rollers C, owing to the ends C' and D' of the rollers C and D engaging the grooves formed between the shoulders of the bearing rings E and F, F', as above mentioned.

Figure 5:
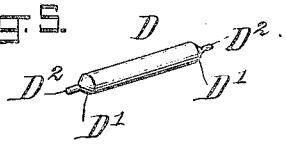

The ends of the rings E and F, F' are sufficiently spaced apart to permit the use of spindles $D^2$ formed on the conical ends D' of the spacing rollers D, if it is desired to use such rollers as shown in Fig. 5.

In order to render the bearing box and the rollers contained therein dust-proof, a dust-cap H is provided, in the form of a ring, having, at its inner face, an annular groove for the reception of a washer I made of felt or other material and facing the outer end of the bearing box. A retaining ring J, fitted on the sleeve G, rests against the outer end of the bearing box and is provided with an outwardly-extending annular flange J' engaging the washer I, so as to hold the same in place. The ring K held on the sleeve G abuts against the retaining ring J, and this ring K, as well as the dust-proof cap H for the inner roller bearing, is engaged by an annular flange A' formed on the journal or spindle A, and the ring K and the dust-proof cap H for the outer roller bearing are engaged by a nut $A^2$ screwing on the reduced threaded end $A^3$ of the journal or spindle A. Thus the several parts of each roller bearing are securely held in place, and at the same time the roller bearings are rendered completely dust-proof, so as to insure long life thereof.

The outer end of the sleeve G is adapted to receive a bushing L, to permit of conveniently fitting the sleeve G onto journals or spindles A of tapering or of different sizes, it being understood that in some cases the sleeve G may be entirely dispensed with and the ring F of each roller bearing fitted directly on the journal or spindle A. As shown in Fig. 1, both the hub B and the sleeve G are provided with annular shoulders for engagement by the inner ends of the rings E and F, to limit the inward movement of the bearing boxes containing the main rollers C and the spacing rollers D.

The detailed construction of the hub B shown in Fig. 1 forms no part of this invention, and hence detailed description of the same is not deemed necessary.

The roller bearing shown and described is simple and durable in construction, composed of comparatively few parts, not liable to get out of order, and by having the bearing box constructed in the manner described, the several parts of the roller bearing can be readily and conveniently assembled and placed in position on the device on which the roller bearing is to be used.

Having thus described my invention, I claim as new and desire to secure by Letters Patent:—

1. A roller bearing having annular grooves approximately V-shaped in cross section, the bearing being formed of an outer bearing ring and an inner bearing ring, the latter made of two ring-shaped members, one containing the other, a set of main rollers having conical ends in engagement with the said annular grooves, and a set of spacing rollers having conical ends in engagement with the said annular grooves, the said spacing rollers alternating with the said main rollers, and the said main rollers and the said spacing rollers having their axes traveling in the same circular path.

2. A roller bearing having annular grooves approximately V-shaped in cross section, the bearing being formed of outer and inner bearing rings, one of said rings being composed of two ring shaped members, one containing the other, a set of main rollers having their ends in engagement with said annular grooves, and a set of spacing rollers having their ends in engagement with said annular grooves, the said spacing rollers alternating with the said main rollers, and the said main rollers and the said spacing rollers having their axes traveling in the same circular path.

3. A roller bearing comprising inner and outer rings having on each end beveled shoulders, the adjacent shoulders of the inner and outer rings forming approximately V-shaped annular grooves, one of said rings being composed of two ring-shaped members, one containing the other, a set of main rollers having their ends in engagement with the said grooves, and a set of spacing rollers having their ends in engagement with the said grooves, the said spacing rollers alternating with the said main rollers, and the said main rollers and the said spacing rollers having their axes traveling in the same circular path.

In testimony whereof I have signed my name to this specification in the presence of two subscribing witnesses.

ELLSWORTH JOSEPH EDWARDS.

Witnesses:
W. H. EILERS,
ELMER T. THOMPSON.